(12) United States Patent
Lopez et al.

(10) Patent No.: US 7,758,060 B2
(45) Date of Patent: Jul. 20, 2010

(54) INTEGRATED TOW HOOK AND BUMPER MOUNTING BRACKET

(75) Inventors: Martin D. Lopez, Whitmore Lake, MI (US); Zenyu Lian, Northville, MI (US); Brent R. Sovoda, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 200 days.

(21) Appl. No.: 12/115,968

(22) Filed: May 6, 2008

(65) Prior Publication Data

US 2009/0278333 A1 Nov. 12, 2009

(51) Int. Cl.
*B60D 1/14* (2006.01)
(52) U.S. Cl. ............... 280/495; 280/505; 280/504; 403/187
(58) Field of Classification Search ........... 280/495, 280/505; 403/187
See application file for complete search history.

(56) References Cited

U.S. PATENT DOCUMENTS

| 6,802,522 | B1 | 10/2004 | Park et al. |
| 6,893,063 | B2 | 5/2005 | Harrison et al. |
| 6,896,281 | B2 * | 5/2005 | Lenzen et al. ............... 280/495 |
| 6,979,016 | B1 * | 12/2005 | Wegener ..................... 280/505 |
| 7,222,873 | B2 * | 5/2007 | Rodgers ...................... 280/495 |
| 2005/0236809 | A1 | 10/2005 | Haneda et al. |
| 2006/0255603 | A1 | 11/2006 | Rebuffet et al. |
| 2007/0024027 | A1 | 2/2007 | Pratt et al. |

* cited by examiner

*Primary Examiner*—Lesley Morris
*Assistant Examiner*—Marlon A Arce
(74) *Attorney, Agent, or Firm*—Gregory Brown; Brooks Kushman P.C.

(57) ABSTRACT

An integrated tow hook and vehicle bumper mounting bracket assembly including a mounting bracket including a frame mounting surface and a bumper mounting surface. A vehicle bumper assembly may be removably securable to the bumper mounting surface of the mounting bracket, and a tow hook may be removably securable to the frame mounting surface of the mounting bracket by one or more mechanical fasteners. The mechanical fastener used to secure the tow hook to the mounting bracket may further serve to secure the mounting bracket to a vehicle frame.

17 Claims, 4 Drawing Sheets

INTEGRATED TOW HOOK AND BUMPER MOUNTING BRACKET

BACKGROUND OF INVENTION a. Field of Invention

The invention relates generally to bumper mounting assemblies, and more particularly to an integrated bracket to mount both a vehicle's bumper and a tow hook to the vehicle's frame.

b. Description of Related Art

Vehicle bumpers are commonly secured to vehicle frames by bolting the vehicle bumper assembly to a substantially vertical mounting plate welded to the vehicle's frame. If the vehicle is involved in a collision, the impact energy of the collision is transferred from the bumper to the vehicle's frame, commonly resulting in the structural deformation of the mounting plate. To replace the damaged bumper assembly after such a collision, the front frame horn must be manually reshaped to re-establish the vertical planar orientation of the mounting plate. If the structural damage is severe, the damaged front frame horn must be cut away from the vehicle's frame and a new front frame horn and mounting plate must be welded to the frame in its place. In either case, the work is cumbersome, labor-intensive, and can be relatively expensive.

An additional problem commonly encountered in the automotive industry involves the mounting of tow hooks to a vehicle. For pick-up trucks or sport utility vehicles, tow hooks are commonly secured to the vehicle frame by welding the tow hook to a mounting plate, and then welding the mounting plate to a surface on the vehicle frame. This mounting method ensures a strong connection between the tow hook and the vehicle's frame, providing the strength necessary for the tow hook to be used to tow loads or support the towing of the vehicle by another vehicle. However, these two independent welding processes can result in increased labor and part expenses.

In order to overcome the problems associated with traditional tow hook mounting methods, tow hook mounting devices that do not involve welding have been developed. U.S. Pat. No. 6,802,522 to Park discloses a tow hook (10) bolted to a mounting base (100). While the weld plate and welding operations of the conventional tow hook mounting method appear to be eliminated, several problems remain. Specifically, the tow hook of Park requires an independent manufacturing operation to mount the tow hook to a bumper mounting plate coupled to the vehicle's frame horn, resulting in higher labor costs. Additionally, the bumper mounting plate supporting the tow hook is welded to the vehicle's frame, and thus a collision as previously described would still require a cutting and welding operation to replace the damaged mounting plate, resulting in expensive and time-consuming repairs.

Still other bumper mounting devices attempt to overcome the aforementioned shortcomings of welding the bumper assembly mounting plate to the frame while also attempting to reduce the cost associated with an independent tow hook mounting operation. Specifically, U.S. Patent App. Pub. No. 2006/0255603 to Rebuffet et at (hereinafter "Rebuffet") discloses a multi-chambered extruded beam bumper (35) secured in a transverse orientation by mechanically fastening plate (34) to the frame horn. Plate (34) is welded to a cylindrical connecting element (21), and a central cylindrical hollow chamber (24) is centrally disposed within connecting element (21) and adapted to receive a threaded towing hook (31).

However, many drawbacks still exist with the device of Rebuffet. Primarily, a collision will result in the costly replacement of the entire bumper structure since the bumper beam of Rebuffet is designed to deform to absorb the energy of the collision. Additionally, many vehicles do not have a transverse bumper beam as disclosed by Rebuffet because the bumper structure itself is engineered to plastically deform in a low impact collision, absorbing energy and snapping back into its original shape. Also, hollow chamber (24) must be tapped to receive the threaded end of tow hook (31), resulting in an additional precision manufacturing operation that results in increased costs for the manufacturer. Finally, the tow hooks of Rebuffet are not permanently attached to the vehicle's frame and can thus be misplaced or stolen.

It is therefore desirable to provide a bumper mounting bracket that allows for a quick and relatively inexpensive replacement of a bumper assembly after a collision while at the same time eliminating the costly manufacturing operation of securing the tow hook to the vehicle frame.

SUMMARY OF THE INVENTION

The invention overcomes the drawbacks and deficiencies of prior art vehicle tow hook and related mounting devices by providing an integrated tow hook and vehicle bumper mounting bracket assembly including a mounting bracket having a substantially horizontal frame mounting surface and a substantially vertical bumper mounting surface. The frame and bumper mounting surfaces may be formed integrally with the mounting bracket. A vehicle bumper assembly may be removably securable to the bumper mounting surface of the mounting bracket by one or more bolts. A tow hook may be disposed between the mounting bracket and a vehicle frame, with the tow hook being removably securable to the frame mounting surface of the mounting bracket by one or more bolts. The bolt securing the tow hook to the mounting bracket may further serve to secure the mounting bracket to the vehicle frame.

The invention also provides an integrated tow hook and vehicle bumper mounting bracket assembly including a mounting bracket having a frame mounting surface and a bumper mounting surface, and a vehicle bumper assembly removably securable to the bumper mounting surface of the mounting bracket. A tow hook may be removably securable to the frame mounting surface of the mounting bracket by one or more mechanical fasteners. The mechanical fastener used to secure the tow hook to the mounting bracket may further serve to secure the mounting bracket to a vehicle frame.

For the assembly described above, the frame and bumper mounting surfaces may be integrally formed with the mounting bracket. In a particular embodiment, the frame mounting surface may be substantially horizontal, and the bumper mounting surface may be substantially vertical. The mechanical fastener may be a bolt. The assembly may further include a bumper mounting retainer secured to the mounting bracket, with the bumper mounting retainer being adapted to receive one or more mechanical fasteners that serve to secure the bumper mounting assembly to the bumper mounting surface.

The invention yet further provides an integrated tow hook and vehicle bumper mounting bracket assembly including a mounting bracket having a frame mounting surface and a bumper mounting surface, and a vehicle bumper assembly removably securable to the bumper mounting surface of the mounting bracket. A tow hook may be secured to the frame mounting surface of the mounting bracket. The tow hook may be removably secured to the frame mounting surface by one or more mechanical fasteners, with the mechanical fastener used to secure the tow hook to the mounting bracket further serving to secure the mounting bracket to a vehicle frame.

For the assembly described above, the tow hook may be integrally formed with the frame mounting surface. The frame and bumper mounting surfaces may be integrally formed with the mounting bracket. In a particular embodiment, the frame mounting surface may be substantially horizontal, and the bumper mounting surface may be substantially vertical. The mechanical fastener may be a bolt. The assembly may further include a bumper mounting retainer secured to the mounting bracket, with the bumper mounting retainer being adapted to receive one or more mechanical fasteners that serve to secure the bumper mounting assembly to the bumper mounting surface.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION OF THE PREFERRED EMBODIMENTS

Figure 1:
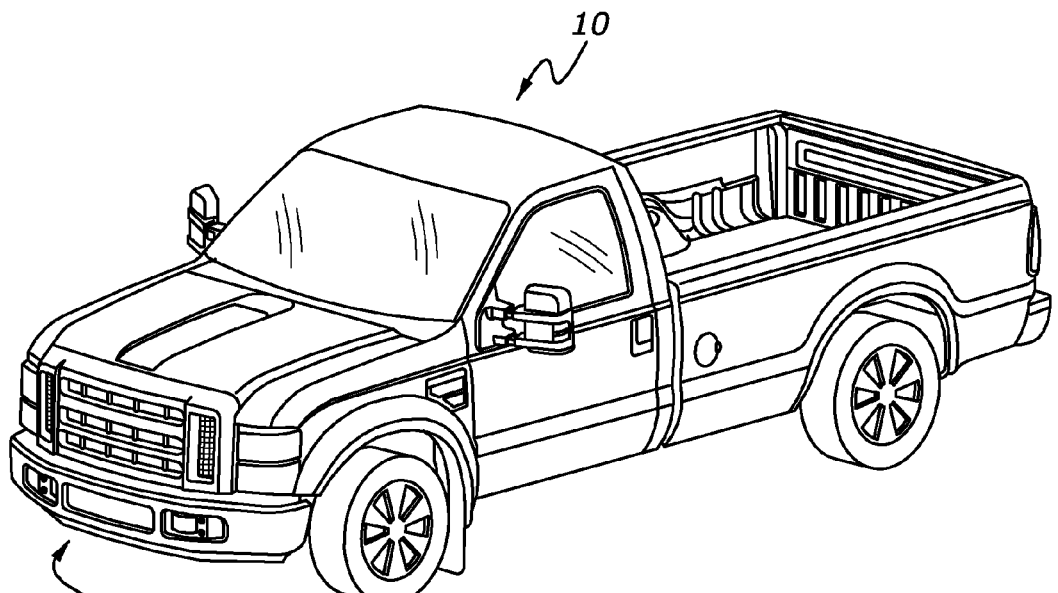
FIG. 1 is an isometric view of a pick-up truck including a conventional bumper with tow hooks of an integrated bumper mounting bracket assembly according to the present invention, the tow hooks being accessible by apertures in the bumper structure.
Figure 2:
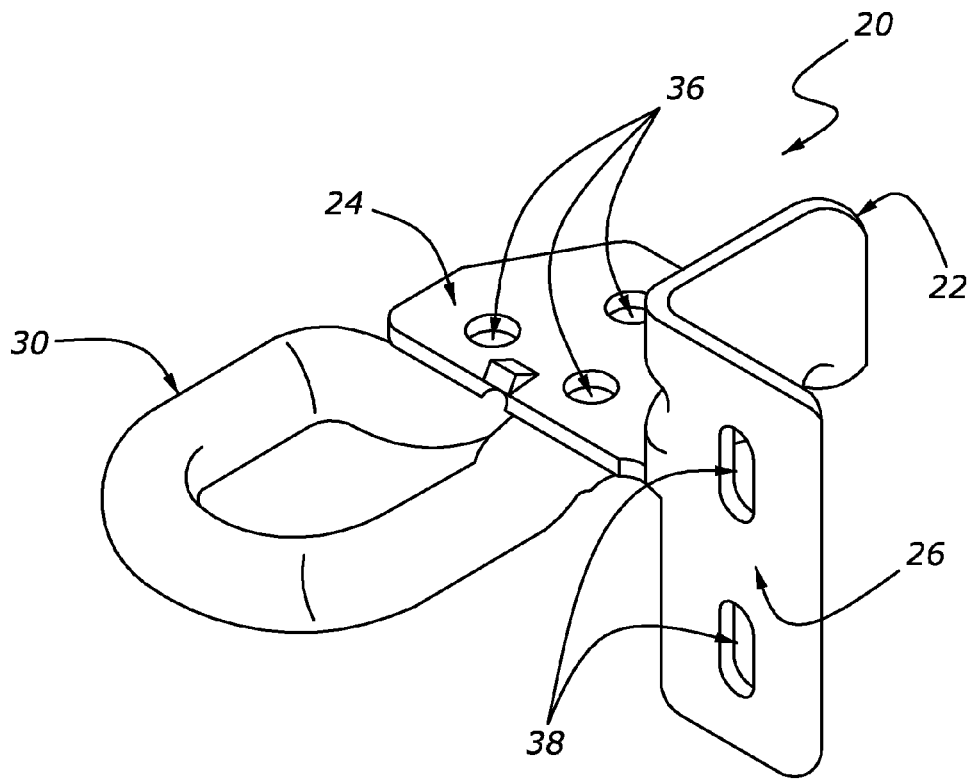
FIG. 2 is an isometric view of an embodiment of the integrated bumper mounting bracket assembly of FIG. 1.
Figure 3:
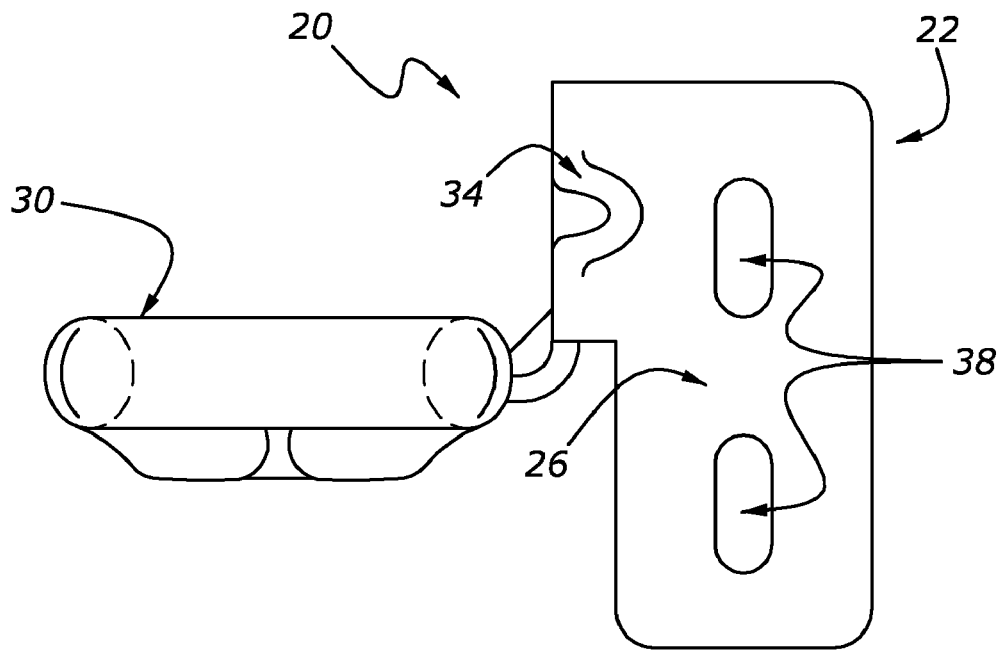
FIG. 3 is an front view of the integrated bumper mounting bracket assembly of FIG. 1.
Figure 4:
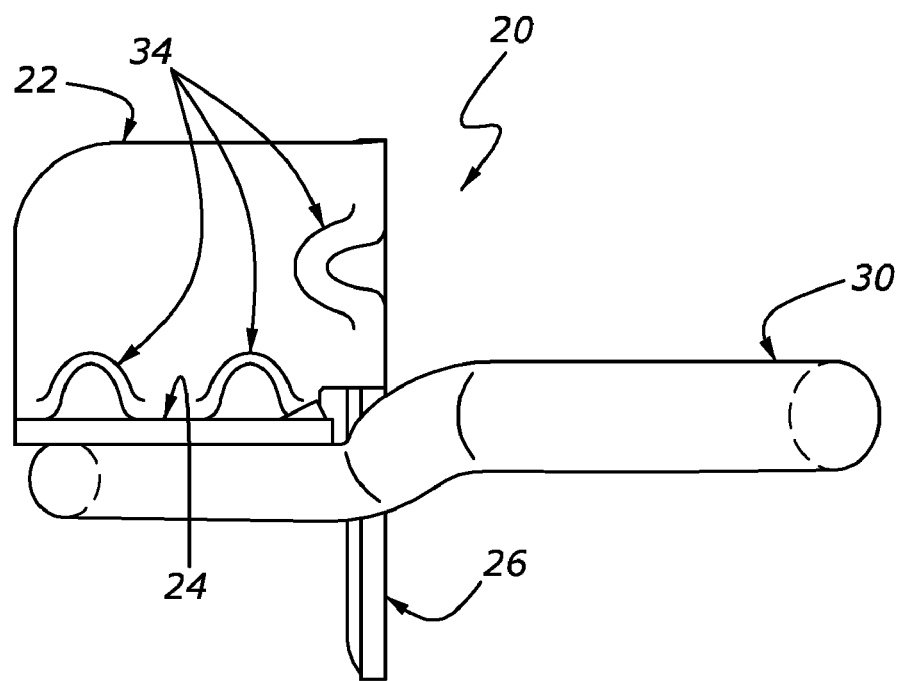
FIG. 4 is a side view of the integrated bumper mounting bracket assembly of FIG. 1.
Figure 5:
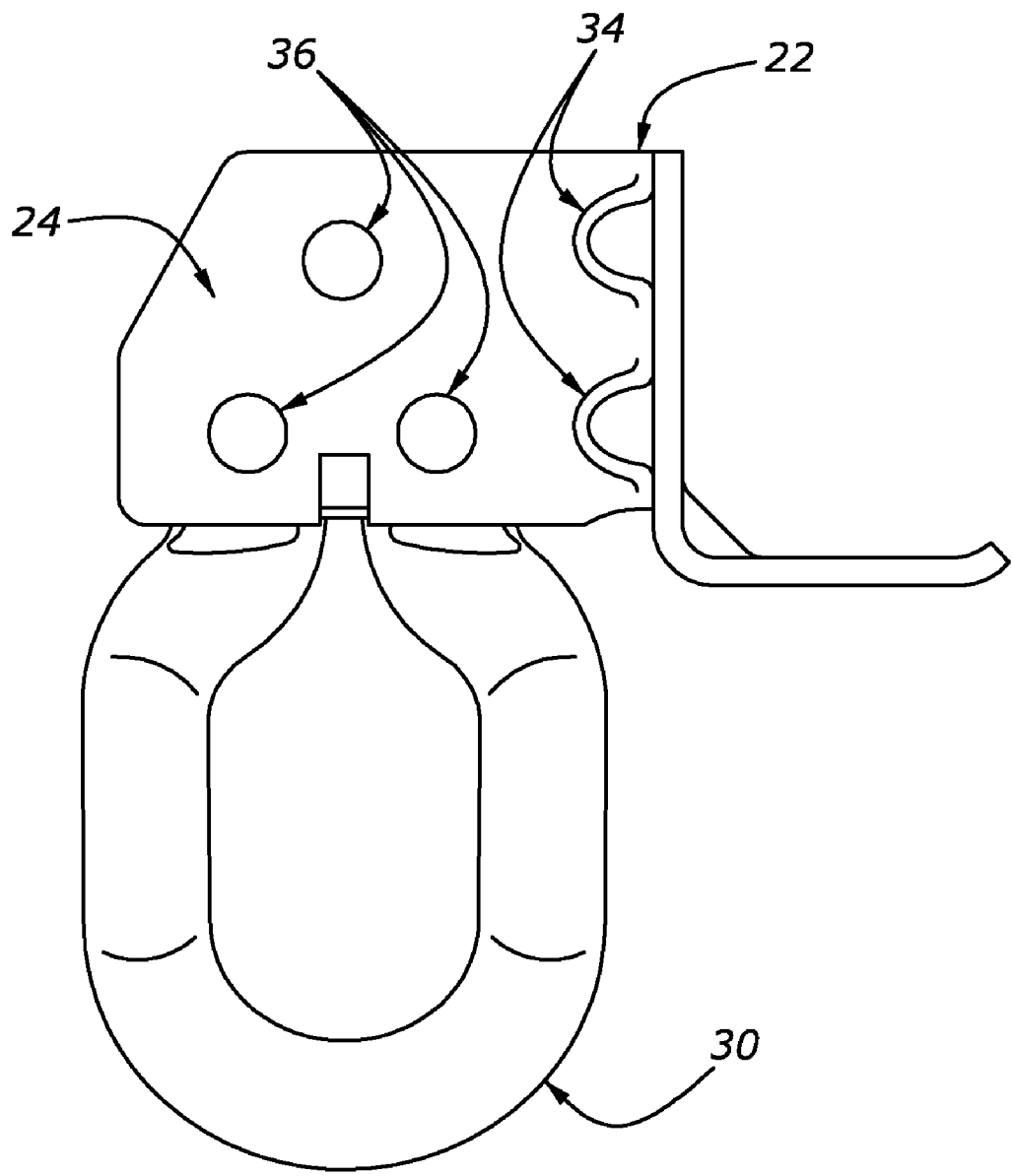
FIG. 5 is a top view of the integrated bumper mounting bracket assembly of FIG. 1.
Figure 6:
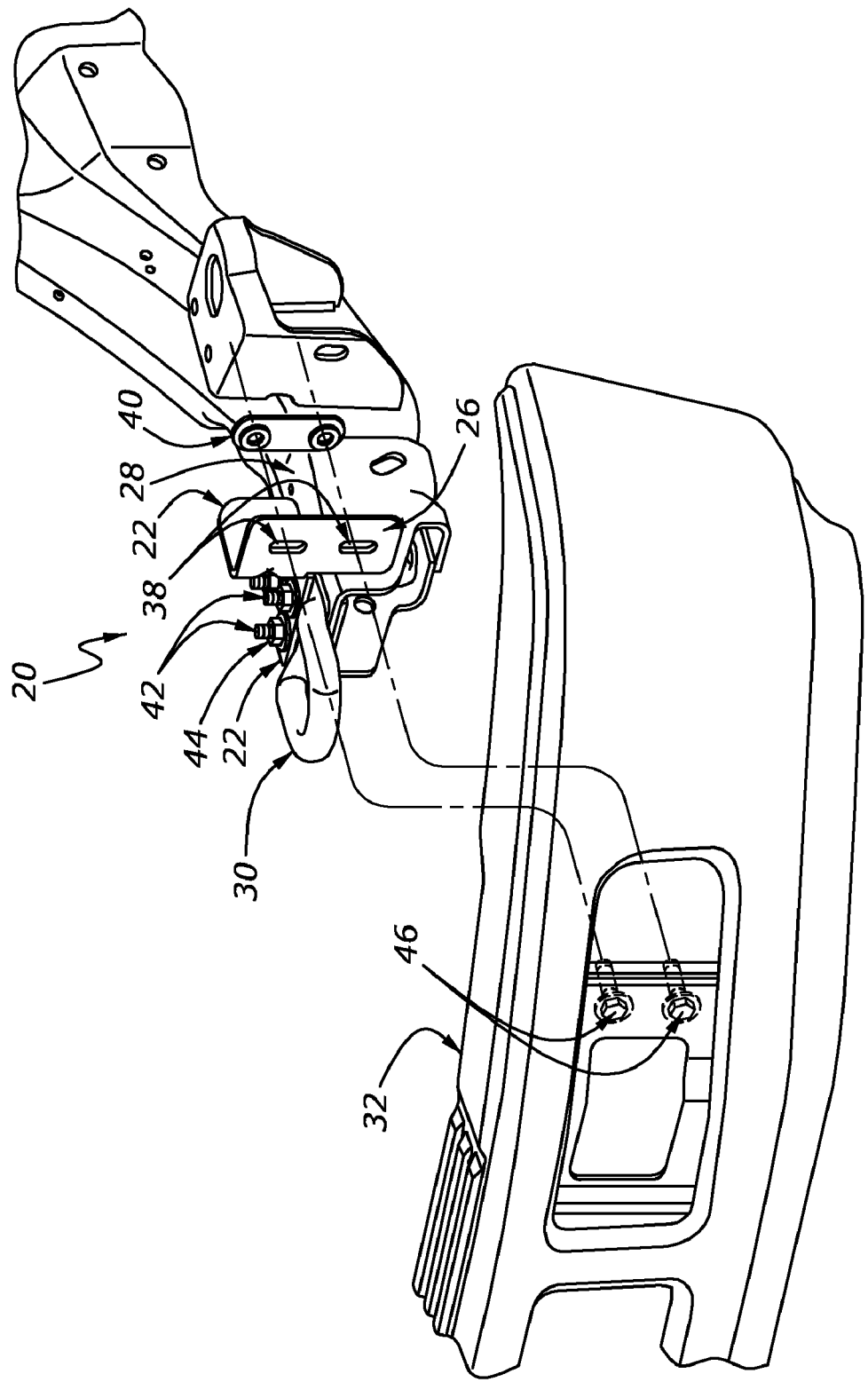
FIG. 6 is an partially exploded isometric view of the components of the integrated bumper mounting bracket assembly of FIG. 1.

Referring now to the drawings wherein like reference numerals designate corresponding parts throughout the several views, FIGS. 1-6 illustrate various views of a integrated tow hook and bumper mounting bracket assembly according to the present invention, the assembly being hereinafter generally designated "integrated bumper mounting bracket assembly 20."

Referring to FIGS. 1-6, integrated bumper mounting bracket assembly 20 may generally include an integrated mounting bracket 22, which includes of a substantially horizontal frame mounting surface 24 and a substantially vertical bumper mounting surface 26, both surfaces being integrally formed with integrated mounting bracket 22. Frame mounting surface 24 of integrated mounting bracket 22 may be removably secured to vehicle frame rail 28 (see FIG. 6) of pick-up truck 10 by a plurality of mechanical fastening means, the mechanical fastening means additionally serving to secure a tow hook 30 between frame mounting surface 24 and vehicle frame rail 28 (if tow hook 30 is formed as a separate component from integrated mounting bracket 22). A vehicle bumper assembly 32 may be removably secured to bumper mounting surface 26 by an additional mechanical fastening means.

As illustrated in FIGS. 2-6, in one embodiment, integrated mounting bracket 22 may be formed out of a generally planar pre-cut steel blank that is subjected to bending operations that form frame mounting surface 24 and bumper mounting surface 26. In this embodiment, integrated mounting bracket 22 may also include a plurality of stiffening ribs 34 formed during the bending operation creating frame mounting surface 24 and bumper mounting surface 26. These stiffening ribs 34 may provide structural support for integrated mounting bracket 22 enabling frame mounting surface 24 and bumper mounting surface 26 to more effectively resist bending forces encountered during the operation of the vehicle.

In other embodiments, frame mounting surface 24 and bumper mounting surface 26 may be coupled to integrated mounting bracket 22 using any means known in the art, including, but not limited to, welding and mechanical fastening. In still other embodiments, frame mounting surface 24 and bumper mounting surface 26 may be oriented at any angle relative to each other, the angles being dictated by the relative orientation of the mounting surfaces on the vehicle frame rail 28 and vehicle bumper assembly 32.

Integrated bumper mounting bracket assembly 20 may also include a plurality of frame mounting apertures 36 disposed on frame mounting surface 24. In the embodiment illustrated in FIGS. 2-6, frame mounting apertures 36 may each be circular in shape and each dimensioned to receive a mechanical fastening device, such as a bolt. The array of frame mounting apertures 36 in this embodiment takes the general shape of an equilateral triangle. However, it is contemplated that frame mounting apertures 36 can take on any shape, including that of a slot, polygon, or oval. Furthermore, the array of frame mounting apertures 36 can be disposed on frame mounting surface 24 in any of a variety of patterns.

Integrated bumper mounting bracket assembly 20 may further include a plurality of bumper mounting apertures 38 disposed on bumper mounting surface 26. In the embodiment illustrated in FIGS. 2-6, bumper mounting apertures 38 may be rounded slots and dimensioned to receive a mechanical fastening device, such as a bolt. Slots may be used instead of circular apertures to simplify the bumper mounting operation in an instance when a vehicle bumper assembly 32 would not perfectly align with smaller mounting apertures. In this embodiment, bumper mounting apertures 38 are disposed on bumper mounting surface 26 such that the longitudinal axis of bumper mounting apertures 38 are collinear with a generally vertical axis passing through the horizontal midpoint of bumper mounting surface 26. However, in other embodiments, bumper mounting apertures 38 may take any shape, including that of a circle, polygon, or oval, and the array of apertures 38 may be disposed on bumper mounting surface 26 in any of a variety of orientations.

As briefly discussed above, integrated bumper mounting bracket assembly 20 also includes tow hook 30. Tow hook 30 can be formed as a one-piece cast steel part, or formed from a length of cold rolled steel. Tow hook 30 may generally be semi-circular in cross sectional shape and include an elongated body adapted to be engaged by a tow rope or tow rod, with a mounting portion (not shown) that is adapted to be retained between frame mounting surface 24 and vehicle frame rail 28. The mounting portion may include a plurality of apertures that are dimensioned and oriented to receive the mechanical fastening device used to secure frame mounting surface 24 to vehicle frame rail 28. Alternatively, tow hook 30 may be formed with frame mounting surface 24 as an integral component. In the embodiment illustrated in FIGS. 2-6, the elongated body of tow hook 30 may take the general shape of an oval when viewed from the generally vertical perspective of FIG. 5.

In other embodiments, the elongated body of tow hook 30 can take any number of shapes, including, but not limited to, a semi-circle, a J-hook, an eye-hook, or a cleat. Additionally, any number of cross-sectional shapes may be contemplated, including an oval or a polygon, or any combination thereof. Furthermore, tow hook 30 may be fabricated from any suitable material known in the art, including steel, aluminum, composite materials, or any other type of metal. Tow hook 30 may also be symmetrical about a horizontal or vertical plane or asymmetrical about one or both of a horizontal or vertical plane.

Integrated bumper mounting bracket assembly 20 may also include a bumper mounting retainer 40, which is an elongated plate with a plurality of threaded apertures adapted to receive bumper mounting bolts 46. When vehicle bumper assembly 32 is secured to bumper mounting surface 26, bumper mounting retainer 40 receives bumper mounting bolts 46, allowing the bumper mounting bolts to fully secure vehicle bumper assembly 32 to integrated mounting bracket 22.

The operation of integrated bumper mounting bracket assembly 20 will now be described in detail with reference to FIGS. 1-6.

Specifically, in order to mount integrated bumper mounting bracket assembly 20 to vehicle frame rail 28, frame mounting bolts 42 may be placed through apertures (not shown) disposed on a generally horizontal surface of vehicle frame rail 28. Frame mounting bolts 42 may be oriented such that the threaded ends of the bolts extend from the apertures on the vehicle's frame. When the predetermined number of frame mounting bolts 42 are in position, if tow hook 30 is formed as a separate component from integrated mounting bracket 22, tow hook 30 may be placed over the generally horizontal surface of vehicle frame rail 28 such that the threaded ends of the plurality of frame mounting bolts 42 are received in the appropriate mounting plate for tow hook 30. If tow hook 30 is formed with integrated mounting bracket 22, then the threaded ends of the plurality of frame mounting bolts 42 are received in frame mounting apertures 36 disposed on frame mounting surface 24. A frame mounting nut 44 may then be placed on the threaded end of each frame mounting bolt 42 and the frame mounting bolts 42 may be tightened to an appropriate torque, thus securing integrated mounting bracket 22 to vehicle frame rail 28. If tow hook 30 is formed as a separate component than integrated mounting bracket 22, this tightening operation also clamps tow hook 30 between integrated mounting bracket 22 and vehicle frame rail 28, providing structural support and reinforcement to tow hook 30.

Vehicle bumper assembly 32 is now ready to be attached to the vehicle. Apertures through the surface of vehicle bumper assembly 32 may be aligned with appropriate bumper mounting apertures 38 disposed on bumper mounting surface 26 of integrated mounting bracket 22. A bumper mounting bolt 46 may be placed into each of the plurality of bumper mounting apertures 38, and bumper mounting retainer 40 may be aligned to receive the threaded end of each bumper mounting bolt 46. Bumper mounting bolts 46 may be tightened to a specified torque, thus securing vehicle bumper assembly 32 to integrated mounting bracket 22, which has been in turn secured to vehicle frame rail 28.

In the event that the bumper is damaged in a collision and must be replaced, bumper mounting bolts 46 may be removed from vehicle bumper assembly 32, disengaging vehicle bumper assembly 32 from integrated mounting bracket 22. If the collision has resulted in significant structural damage to integrated mounting bracket 22, as when the bumper mounting surface 26 has been severely deformed, integrated mounting bracket 22 can be removed and replaced. In this case, frame mounting bolts 42 may be loosened and removed from vehicle frame rail 28 mounting apertures, and tow hook 30 (if formed separate from integrated mounting bracket 22) and integrated mounting bracket 22 can be discarded or reused as needed. Vehicle bumper assembly 32 may then be re-attached to vehicle frame rail 28 as discussed above.

As is clear from the foregoing description, many of the problems associated with traditional bumper mounting assemblies and tow hook assemblies have been overcome by the present invention. Specifically, the relatively expensive and time consuming post-collision repairs to the traditional bumper mounting bracket have been eliminated. The present invention allows a damaged integrated mounting bracket 22 to be quickly and inexpensively removed and replaced. Additionally, the independent weld operations to first secure the conventional tow hook to a mounting plate and next weld the mounting plate to the vehicle frame have been eliminated, and tow hook 30 now may be coupled to vehicle frame rail 28 in the same manufacturing step that secures vehicle bumper assembly 32 to vehicle frame rail 28. Thus, the material cost involved in providing a tow hook mounting bracket and the labor cost of securing the mounting bracket to the vehicle frame have been eliminated, resulting in a more streamlined manufacturing process and a more profitable end product.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims.

What is claimed is:

1. An integrated tow hook and vehicle bumper mounting bracket assembly comprising:
   a mounting bracket including a substantially horizontal frame mounting surface and a substantially vertical bumper mounting surface, wherein the frame and bumper mounting surfaces are formed integrally with the mounting bracket;
   a vehicle bumper assembly that can be removably secured to the bumper mounting surface of the mounting bracket by at least one bolt; and
   a tow hook disposed between the mounting bracket and a vehicle frame, the tow hook able to be removably secured to the frame mounting surface of the mounting bracket by at least one bolt, wherein the bolt securing the tow hook to the mounting bracket further serves to secure the mounting bracket to the vehicle frame.

2. An assembly according to claim 1, wherein the frame and bumper mounting surfaces are integrally formed with the mounting bracket.

3. An assembly according to claim 1, wherein the frame mounting surface is substantially horizontal.

4. An assembly according to claim 1, wherein the bumper mounting surface is substantially vertical.

5. An assembly according to claim 1, further comprising a bumper mounting retainer secured to the mounting bracket, the bumper mounting retainer being adapted to receive at least one mechanical fastener that serves to secure the bumper mounting assembly to the bumper mounting surface.

6. An integrated tow hook and vehicle bumper mounting bracket assembly comprising:
   a mounting bracket including a substantially horizontal frame mounting surface and a bumper mounting surface;
   a vehicle bumper assembly that can be removably secured to the bumper mounting surface of the mounting bracket; and
   a tow hook secured to the frame mounting surface of the mounting bracket.

7. An assembly according to claim 6, wherein the tow hook is removably secured to the frame mounting surface by at least one mechanical fastener, wherein the mechanical fastener used to secure the tow hook to the mounting bracket further serves to secure the mounting bracket to a vehicle frame.

8. An assembly according to claim 6, wherein the tow hook is integrally formed with the frame mounting surface.

9. An assembly according to claim 6, wherein the frame and bumper mounting surfaces are integrally formed with the mounting bracket.

10. An assembly according to claim 7, wherein the mechanical fastener is a bolt.

11. An assembly according to claim 6, further comprising a bumper mounting retainer secured to the mounting bracket, the bumper mounting retainer being adapted to receive at least one mechanical fastener that serves to secure the bumper mounting assembly to the bumper mounting surface.

12. An integrated tow hook and vehicle bumper mounting bracket assembly comprising:
   a mounting bracket including a frame mounting surface and a substantially vertical bumper mounting surface;
   a vehicle bumper assembly that can be removably secured to the bumper mounting surface of the mounting bracket; and
   a tow hook secured to the frame mounting surface of the mounting bracket.

13. An assembly according to claim 12, wherein the tow hook is removably secured to the frame mounting surface by at least one mechanical fastener, wherein the mechanical fastener used to secure the tow hook to the mounting bracket further serves to secure the mounting bracket to a vehicle frame.

14. An assembly according to claim 13, wherein the mechanical fastener is a bolt.

15. An assembly according to claim 12, wherein the tow hook is integrally formed with the frame mounting surface.

16. An assembly according to claim 12, wherein the frame and bumper mounting surfaces are integrally formed with the mounting bracket.

17. An assembly according to claim 12, further comprising a bumper mounting retainer secured to the mounting bracket, the bumper mounting retainer being adapted to receive at least one mechanical fastener that serves to secure the bumper mounting assembly to the bumper mounting surface.

* * * * *